US012769440B2

(12) United States Patent
Li et al.

(10) Patent No.: US 12,769,440 B2
(45) Date of Patent: Oct. 20, 2026

(54) METHOD AND APPARATUS FOR PROMPTING BATTERY LEVEL

(71) Applicant: VIVO MOBILE COMMUNICATION CO., LTD., Dongguan (CN)

(72) Inventors: Yangqin Li, Dongguan (CN); Jianhui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 170 days.

(21) Appl. No.: 18/520,550

(22) Filed: Nov. 27, 2023

(65) Prior Publication Data

US 2024/0094893 A1 Mar. 21, 2024

Related U.S. Application Data

(63) Continuation of application No. PCT/CN2022/095954, filed on May 30, 2022.

(30) Foreign Application Priority Data

May 31, 2021 (CN) ........................ 202110599483.1

(51) Int. Cl.
*G06F 3/04847* (2022.01)
*G06F 3/04845* (2022.01)
(Continued)

(52) U.S. Cl.
CPC ...... *G06F 3/04847* (2013.01); *G06F 3/04845* (2013.01); *G06F 3/165* (2013.01); *H04M 1/724* (2021.01)

(58) Field of Classification Search
None
See application file for complete search history.

(56) References Cited

U.S. PATENT DOCUMENTS 5,218,607 A * 6/1993 Saito .......................... G06F 1/30 365/228
2003/0060765 A1* 3/2003 Campbell .............. G16H 40/63 604/131
(Continued)

FOREIGN PATENT DOCUMENTS

CN 202230190 U 5/2012
CN 102523344 A 6/2012
(Continued)

OTHER PUBLICATIONS

International Search Report issued in corresponding International Application No. PCT/CN2022/095954, mailed Aug. 31, 2022, 5 pages.
(Continued)

*Primary Examiner* — Henry Orr
(74) *Attorney, Agent, or Firm* — IPX PLLC

(57) ABSTRACT

A method for prompting a battery level is provided. The method includes: obtaining a display mode of a current interface of an electronic device when the electronic device is in an uncharged state and a battery level of the electronic device is less than a first preset battery level. The method further includes performing a target adjustment operation based on the display mode of the current interface. The target adjustment operation is associated with the display mode of the current interface. The display mode of the current interface includes a full-screen mode or a non-full-screen mode.

16 Claims, 5 Drawing Sheets

(51) Int. Cl.
*G06F 3/16* (2006.01)
*H04M 1/724* (2021.01)

(56) References Cited

U.S. PATENT DOCUMENTS

| | | | | |
|---|---|---|---|---|
| 2007/0016867 | A1* | 1/2007 | Nickell | G06F 9/451 715/730 |
| 2013/0097458 | A1 | 4/2013 | Sekino et al. | |
| 2015/0128055 | A1* | 5/2015 | Yasar | H04M 1/724 715/736 |
| 2020/0249821 | A1* | 8/2020 | Mao | H04M 1/72436 |

FOREIGN PATENT DOCUMENTS

| | | | | |
|---|---|---|---|---|
| CN | 103024179 | A | | 4/2013 |
| CN | 104572410 | A | * | 4/2015 |
| CN | 105869605 | A | | 8/2016 |
| CN | 106325670 | A | | 1/2017 |
| CN | 107193716 | A | | 9/2017 |
| CN | 107391012 | A | | 11/2017 |
| CN | 107835302 | A | | 3/2018 |
| CN | 109005283 | A | | 12/2018 |
| CN | 111710315 | A | | 9/2020 |
| CN | 113190420 | A | | 7/2021 |

OTHER PUBLICATIONS

First Office Action issued in related Chinese Application No. 202110599483.1, mailed Feb .11, 2022, 8 pages.

Second Office Action issued in related Chinese Application No. 202110599483.1, mailed Sep. 6, 2022, 6 pages.

Supplemental search report in related Chinese Application No. 202110599483.1, mailed Jan. 9, 2023, 2 pages.

* cited by examiner

METHOD AND APPARATUS FOR PROMPTING BATTERY LEVEL

CROSS-REFERENCE TO RELATED APPLICATIONS

This application is a continuation of International Application No. PCT/CN2022/095954, filed on May 30, 2022, which claims priority to Chinese Patent Application No. 202110599483.1, filed on May 31, 2021. The entire contents of each of the above-referenced applications are expressly incorporated herein by reference.

TECHNICAL FIELD

This application belongs to the field of electronic device technologies, and in particular to a method and an apparatus for prompting a battery level.

BACKGROUND

At present, when using an electronic device, a user often encounters a case in which a battery level of the electronic device is to be used up but is not charged timely, for example, the user is focusing on playing a game or is addicted to a TV series. In these cases, the electronic device is usually displayed in a full-screen mode. While the battery level is prompted, a battery level mark in a status bar is adjusted to be red or a prompt (for example, a current remaining battery level is only X %) is output in the status bar, to prompt that the user is to charge the device. However, prompting of the battery level is easily ignored by the user, resulting in a poor battery level prompting effect.

SUMMARY

Embodiments of this application are intended to provide a method and an apparatus for prompting a battery level.

According to a first aspect, an embodiment of this application provides a method for prompting a battery level. The method includes:

obtaining a display mode of a current interface of an electronic device in a case that the electronic device is in an uncharged state, and a battery level of the electronic device is less than a first preset battery level; and performing a target adjustment operation based on the display mode of the current interface, where the target adjustment operation is associated with the display mode of the current interface, and the display mode of the current interface includes a full-screen mode or a non-full-screen mode.

According to a second aspect, an embodiment of this application provides an apparatus for prompting a battery level. The apparatus includes:

an obtaining module, configured to obtain a display mode of a current interface of an electronic device in a case that the electronic device is in an uncharged state, and a battery level of the electronic device is less than a first preset battery level; and an adjustment module, configured to perform a target adjustment operation based on the display mode of the current interface, where the target adjustment operation is associated with the display mode of the current interface, and the display mode of the current interface includes a full-screen mode or a non-full-screen mode.

According to a third aspect, an embodiment of this application provides an electronic device. The electronic device includes a processor, a memory, and a program or instructions stored in the memory and capable of running on the processor. When the program or the instructions are executed by the processor, the steps of the method according to the first aspect are implemented.

According to a fourth aspect, an embodiment of this application provides a readable storage medium. The readable storage medium stores a program or instructions, and when the program or the instructions are executed by a processor, the steps of the method according to the first aspect are implemented.

According to a fifth aspect, an embodiment of this application provides a chip. The chip includes a processor and a communication interface. The communication interface is coupled to the processor, and the processor is configured to run a program or instructions to implement the method according to the first aspect.

According to a sixth aspect, a computer program/computer program product is provided, where the computer program/computer program product is stored in a non-transient storage medium, and the program/program product is executed by at least one processor to implement the steps of the method according to the first aspect.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein Objects classified by "first", "second", and the like are usually of a same type, and the number of objects is not limited. For example, there may be one or more first objects. In addition, in the specification and the claims, "and/or"

represents at least one of connected objects, and a character "/" generally represents an "or" relationship between associated objects.

With reference to the accompanying drawings, a method for prompting a battery level provided in an embodiment of this application is described in detail by using a specific embodiment and an application scenario.

Figure 1:
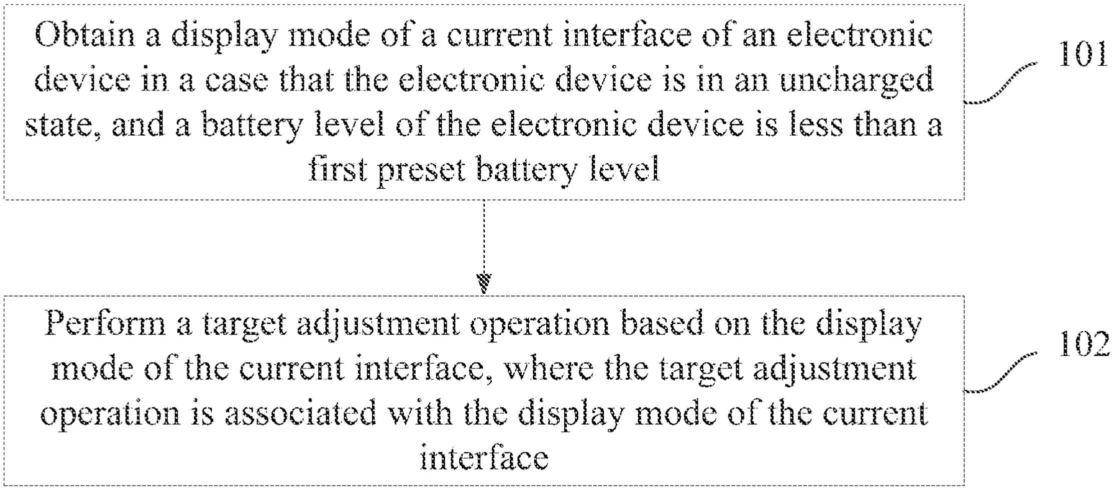
FIG. 1 is a first flowchart of a method for prompting a battery level according to an embodiment of this application.

As shown in FIG. 1, an embodiment of this application provides a method for prompting a battery level. The method includes the following steps.

Step 101: Obtain a display mode of a current interface of an electronic device in a case that the electronic device is in an uncharged state, and a battery level of the electronic device is less than a first preset battery level.

The method may be applied to the electronic device, and the electronic device performs the method. In the method for prompting a battery level in this embodiment of this application, a current battery level of the electronic device may be obtained first, and a battery level may be obtained in real time or at preset duration (such as 2 minutes). If the electronic device is in the uncharged state, and the battery level of the electronic device is less than the first preset battery level, a display mode of a running interface currently displayed on the electronic device, that is, a current interface, may be obtained. For example, the display mode may include a full-screen mode or a non-full-screen mode, and the display mode of the current interface of the electronic device may be the full-screen mode or non-full-screen mode. It should be noted that a state that is not the full-screen mode may be referred to as the non-full-screen mode.

Step 102: Perform a target adjustment operation based on the display mode of the current interface, where the target adjustment operation is associated with the display mode of the current interface.

That is, after the display mode of the current interface is obtained, the target adjustment operation corresponding to the display mode of the current interface is performed, to implement prompting of the battery level. This may be understood that different adjustment operations may be performed in different display modes. That is, prompting of the battery level is implemented in different manners in different display modes.

It may be understood that the display mode may include a full-screen display mode and a non-full-screen display mode. In the full-screen display mode, a status bar is not displayed, that is, time information, battery level information, and the like are not displayed. In the non-full-screen display mode, the status bar is displayed above the display interface.

In the method for prompting a battery level in this embodiment, in a case that the electronic device is in the uncharged state, and the battery level of the electronic device is less than the first preset battery level, the display mode of the interface currently displayed on the electronic device, that is, the current interface, is to be obtained, and the target adjustment operation associated with the display mode of the current interface is performed, to implement prompting of the battery level. Because the target adjustment operation associated with the display mode is performed in consideration of the display mode of the current interface during adjustment, to implement prompting of the battery level of the electronic device, a prompting effect may be improved.

In an embodiment, the performing a target adjustment operation based on the display mode of the current interface includes:

adjusting a target attribute parameter of the electronic device in a case that the display mode of the current interface is the full-screen mode, where the target attribute parameter includes at least one of a volume parameter or a screen display parameter.

That is, in a case that the display mode of the current interface is the full-screen mode, prompting may be performed by adjusting the target attribute parameter of the electronic device. That is, the user is prompted by changing the attribute parameter.

In this embodiment, at least one of the attribute parameters such as the volume parameter and a screen display parameter of the electronic device may be adjusted to prompt the user. For example, the attribute parameters such as the volume parameter and the screen display parameter of the electronic device may be reduced, to implement prompting. This may improve a battery level prompting effect.

In an embodiment, the performing a target adjustment operation based on the display mode of the current interface includes:

performing at least one of the following in a case that the display mode of the current interface is the non-full-screen mode:

enlarging a status bar of the electronic device, and enlarging a battery level mark in the status bar.

That is, in a case that the display mode of the current interface is the non-full-screen mode, the status bar of the electronic device may be enlarged, and the status bar includes the battery level mark. It may be understood that after the status bar is enlarged, a display size of another window in the current interface is affected, and a user views the battery level mark in the status bar more possibly. In addition, because viewing of another window in the current interface by the user is affected, an effect of prompting, through the battery level mark in the status bar, the user to perform charging is improved. In addition, the battery level mark in the status bar may be enlarged, to enhance prompting of the battery level. For example, in a case that the status bar of the electronic device is enlarged, a display area of another window except a status bar area in the current interface of the electronic device decreases. In this way, the user may be further prompted, to improve a prompting effect.

In an embodiment, after the performing a target adjustment operation based on the display mode of the current interface, the method further includes:

receiving an adjustment input by a user; and outputting first prompt information in response to the adjustment input, where the first prompt information is used to prompt that the electronic device is to be charged.

It may be understood that the adjustment input by the user may be opposite to an adjustment direction of the target adjustment operation, that is, the adjustment input by the user may be a callback operation for the target adjustment operation. For example, if the adjustment direction of the target adjustment operation is decrease, the adjustment direction of the adjustment input by the user is increase. If the adjustment direction of the target adjustment operation is increase, the adjustment direction of the adjustment input is decrease.

In some embodiments, if the target attribute parameter of the electronic device is adjusted in a case that the display mode of the current interface is the full-screen mode, the foregoing adjustment input is an adjustment input of the target attribute parameter of the electronic device. If adjustment of the target attribute parameter of the electronic device is to decrease the target attribute parameter, the adjustment input by the user is an increase input of the target attribute parameter. If adjustment of the target attribute parameter of the electronic device is to increase the target attribute parameter, the adjustment input is a decrease input of the target attribute parameter.

For example, the performing a target adjustment operation includes: in a case that a volume parameter of the electronic device is adjusted, a screen display parameter of the electronic device is adjusted, or both the volume parameter and the screen display parameter are adjusted, volume of the electronic device is adjusted from first volume to second volume, or a screen brightness is adjusted from a first brightness to a second brightness that are obtained after the target adjustment operation is performed. In this case, the adjustment input by the user may be understood that the user adjusts the second volume to third volume or adjust the second screen brightness to third brightness through the adjustment input because the user perceives change of the electronic device and the change affects operation and viewing by the user. It may be understood that the target adjustment operation is adjustment in a direction that has an obstacle to a user operation, that is, the second volume may be less than the first volume, and the second brightness may be less than the first brightness. The adjustment input by the user is adjustment of the attribute information to be normal again, that is, the third volume may be greater than the second volume, and the third brightness may be greater than the second brightness. For example, it is not limited whether the first volume and the third volume are the same or whether the first brightness and the second brightness are the same.

In some embodiments, if either enlarging the status bar of the electronic device or enlarging the battery level mark in the status bar is performed in a case that the display mode of the current interface is the non-full-screen mode, the foregoing adjustment input includes at least one of a decrease input for the status bar and a decrease input for the battery level mark in the status bar.

In this embodiment of this application, prompting may be performed by performing the target adjustment operation, and a prompting effect may be improved by outputting first prompt information. Further, when the callback operation on the electronic device by the user is detected, the first prompt information may be displayed, to enhance the user's attention to the prompt information and improve the prompting effect.

It should be understood that the first prompt information may be used to prompt charging of the electronic device. For example, the first prompt information may also prompt that if the electronic device is not charged, damage will be caused to a battery of the electronic device. That is, the first prompt information can not only prompt charging, but also prompt a risk of not charging.

In an embodiment, the outputting first prompt information includes:

- displaying bullet-screen prompt information in the current interface in a case that the display mode of the current interface is the full-screen mode; or
- displaying a first window on the current interface in a superimposing manner in a case that the display mode of the current interface is the non-full-screen mode, where the first prompt information is included in the first window.

If the display mode of the current interface is the full-screen mode, it indicates that the current interface is displayed on an entire screen of the electronic device. For example, in the full-screen mode in a game scenario, the entire screen displays a game image. For example, in the full-screen mode in a video play scenario, the entire screen displays a played video image. For another example, in the full-screen mode in a novel reading scenario, a novel content page is displayed in the entire screen. In the full-screen mode, because the current interface is filled with the entire screen, if the prompt is output only in the status bar or the battery level mark in the status bar turns red to prompt the user that the battery level is not enough, and if the user does not exit the full-screen mode, the user cannot view the prompt, and the prompt is easily ignored. Therefore, in this embodiment, in a case that the display mode of the current interface is the full-screen mode, the bullet-screen prompt information may be displayed in the current interface, to implement prompting of the battery level. That is, in a case that the display mode is the full-screen mode, the first prompt information is displayed through the bullet-screen, and the first prompt information is the bullet-screen prompt information for the user to view. If the display mode of the current interface is the non-full-screen mode, a pop-up window, namely, the first window, may be displayed based on the current interface. The first prompt information is included in the first window, to implement prompting of the battery level. That is, in case of different display modes, the first prompt information is output in different manners, to implement prompting of the battery level and improve flexibility of prompting of the battery level.

In the method for prompting a battery level in this embodiment, in a case that the electronic device is not charged and the battery level of the electronic device is less than a first preset battery level, the display mode of the current interface of the electronic device is to be obtained, and a prompt manner is determined based on the display mode of the current interface of the electronic device That is, in a case that the display mode of the current interface is the full-screen mode, the bullet-screen prompt information is displayed in the current interface, to implement prompting of the battery level. This enables the user to view the prompt information on the displayed current interface and improves the prompting effect. In a case that the display mode of the current interface is the non-full-screen mode, the first window is displayed on the current interface in a superimposing manner, and the first prompt information is included in the first window, to implement prompting of the battery level. This helps the user view the prompt information in the displayed first window. In this embodiment, in different display modes, the electronic device outputs the prompt information in different prompt manners, to prompt the user to charge the electronic device and improve flexibility of battery level prompting.

In an embodiment, in a case that the battery level of the electronic device is less than the first preset battery level, the method further includes:

- storing data of a first application running in the electronic device in a case that the battery level of the electronic device is less than a second preset battery level, where the second preset battery level is less than the first preset battery level.

It may be understood that first preset battery level is a low battery level threshold that indicates the electronic device is to be charged, and the second preset battery level may be a lower battery level threshold that indicates that the electronic device is to be powered off.

In a case that the battery level of the electronic device is less than the first preset battery level, the target adjustment operation may be performed to prompt the user to charge the electronic device. If the user does not charge the electronic device, the battery level decreases gradually as the electronic device is used. In a case that the battery level of the electronic device is less than the second preset battery level, data of the first application running in the electronic device may be stored, to prevent a loss of data of the first application due to power-off when the battery level is used up, and protect the data of the first application.

For example, the data may be stored at preset duration, for example, every two minutes.

In an embodiment, the storing data of a first application running in the electronic device includes at least one of the following:

storing data of a first target application running in the electronic device in a case that a preset application list is included and a same first target application exists in both the preset application list and applications running in the electronic device;

displaying a second window, where information about an application running in the electronic device is included in the second window; receiving, from a user, first input of information about a second target application in running applications; and storing data of the second target application running in the electronic device in response to the first input.

The first application includes at least one of the first target application and the second target application.

It should be noted that an application in the preset application list is a preset application of which data is to be stored. If no application of which data is to be stored is preset, it may be understood that the preset application list is empty or the preset application list is not included. In this embodiment, it may be detected whether a same application exists in the preset application list and applications running in the electronic device. In a case that the same first target application exists in the preset application list and the applications running in the electronic device, it indicates that both the preset application list and the applications running in the electronic device include the first target application, that is, the running application includes a preset first target application of which data is to be stored. In this way, the data of the first target application running in the electronic device may be stored, that is, the first application includes the first target application. This prevents the data of the first target application from being lost because of power-off of the electronic device when the battery level is not enough. In addition, the data is saved based on the user's selection of an application, that is, the second window may be displayed. The user may select information (for example, a name) that is displayed in the second window and that is of a running application, and may store data that is selected for the first input and that is of the second target application. That is, the first application includes the second target application. This prevents data of the second target application from being lost because of power-off of the electronic device when the battery level is not enough. In some alternative embodiments, data of the same first target application in the preset application list and applications running in the electronic device may be stored, and the data that is selected for the first input and that is of the second target application may be stored. It should be noted that the second window may be displayed in a case that the preset application list is not included, the second window may be displayed in a case that the same first target application data does not exist in the preset application list and applications running in the electronic device, or the second window may be displayed in a case that the same first target application data exists in the preset application list and the applications running in the electronic device.

For example, information about another application that is in applications running in the electronic device and that is except the same first target application between the preset application list and the applications running in the electronic device is included in the second window. That is, in a case that the same first target application exists in the preset application list and the applications running in the electronic device, the data of the first target application running in the electronic device is stored. For data of another application except the first target application in the running application, the data may be stored by selection of the user in the second window. In this way, flexibility of data storage of the application may be improved, and coverage of stored data may be increased.

Figure 2:
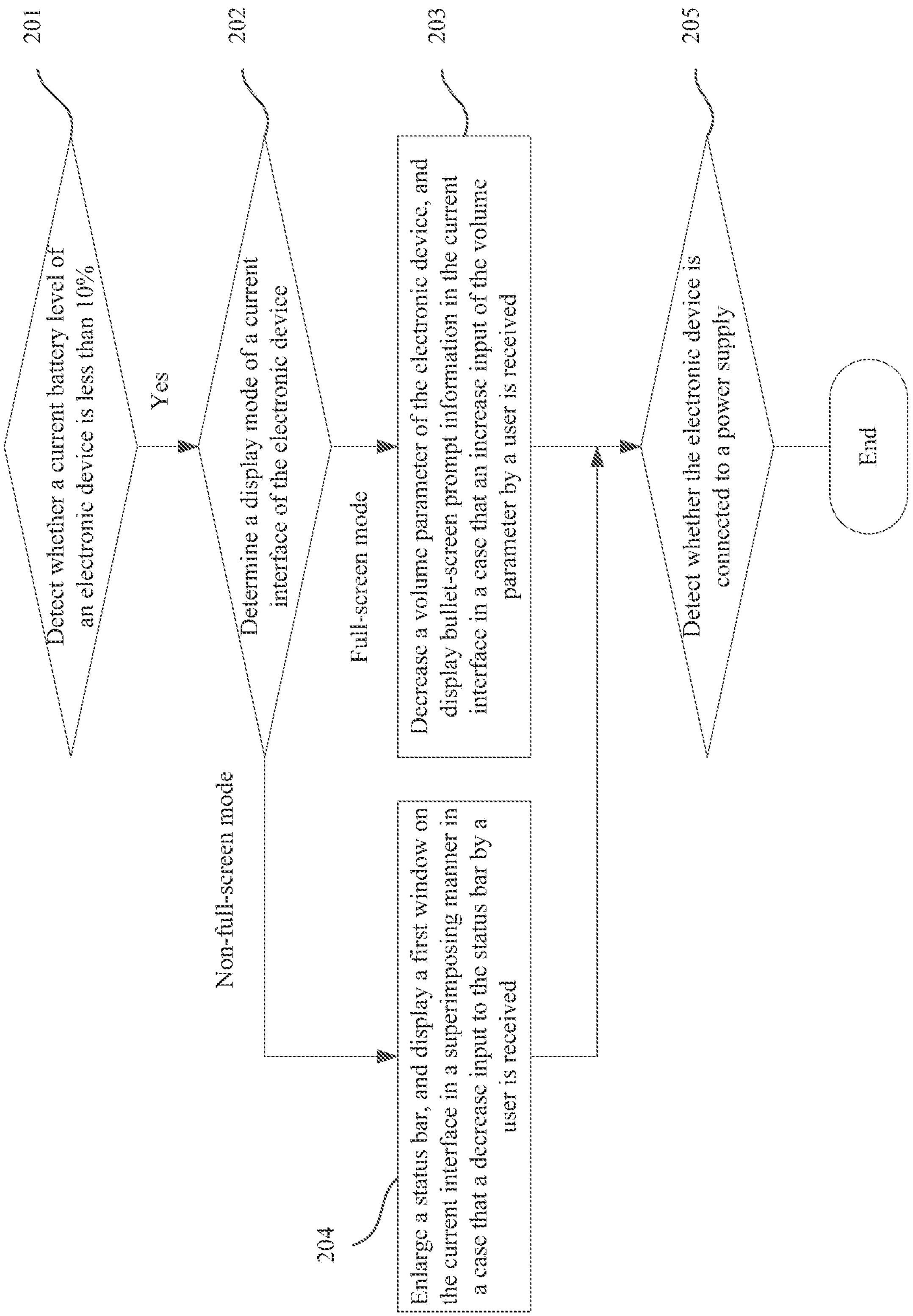
FIG. 2 is a second flowchart of a method for prompting a battery level according to an embodiment of this application.

The following describes a process of the method for prompting a battery level in a specific embodiment. For example, the electronic device is a mobile phone, the first preset battery level is 10%, the second preset battery level is 5%, and the preset duration is 2 minutes. FIG. 2 is a flowchart of a method for prompting a battery level according to an embodiment. A procedure is as follows.

Step 201: Detect whether a current battery level of an electronic device is less than 10%.

If the current battery level of the electronic device is less than 10%, a pre-power-outage processing mode of the device is enabled, and step 202 is performed.

Step 202: Determine a display mode of a current interface of the electronic device.

There are mainly two display modes, that is, a full-screen mode and a non-full-screen mode. For example, a scenario for the full-screen mode may include but is not limited to a game, video play, a video call, a mobile phone call, novel reading, or the like. Another state that is not the full-screen mode is collectively referred to as the non-full-screen mode.

In a case that the display mode is the full-screen mode, to prevent an influence on use of the electronic device by the user, step 203 may be performed.

Step 203: Decrease a volume parameter of the electronic device, and display bullet-screen prompt information in the current interface in a case that an increase input of the volume parameter by a user is received.

That is, in a case that the display mode is the full-screen mode, an attribute parameter such as volume is decreased, and when an adjustment input of adjusting (such as increasing) the volume by a user is received, a bullet-screen prompt for charging is output.

For example, a bullet-screen pops up to prompt the user that "if not charged timely, it may damage your battery of your mobile phone. Please connect to a power supply as soon as possible." That is, a current use state of the electronic device is not interrupted. For example, gaming or a video is not interrupted, and prompting may be performed every 2 minutes. After the bullet-screen prompt information is displayed, step 205 may be further performed.

In a case that the display mode is the non-full-screen mode, to improve a prompting effect, step 204 may be performed.

Step 204: Enlarge a status bar, and display a first window on the current interface in a superimposing manner in a case that a decrease input for the status bar by a user is received.

In the non-full-screen mode, a battery level mark in the status bar may be gradually enlarged with a decrease in a battery level, to highlight the battery level mark and improve a battery level prompting effect, so as to prompt the user to perform charging. If the decrease input of the status bar by the user is received, the first window may be displayed on the current interface in a superimposing manner, that is, the user is prompted through a pop-up window to perform charging. For example, first prompt information is included in the first window. "If not charged timely, it may damage your battery of your mobile phone. Please connect to a power supply as soon as possible." is also prompted. OK or cancel is to be tapped by the user. That is, in a case that a second input by the user to the first window is received, display of the first window is canceled. It is ensured that the user receives the prompt. Similarly, prompting may be performed every two minutes. After the first window is displayed, step 205 may be further performed.

Step 205: Detect whether the electronic device is connected to a power supply.

That is, to ensure that the pre-power-outage processing mode continues, a judgment condition is to be set, and check may be set once every 2 minutes. If the user has connected the power supply, the user exits the mode, and a battery level prompt process ends, and the status bar, the volume, and the like are restored to settings before the pre-power-outage processing mode. If the user does not connect the power supply, step 201 is returned to continue.

Figure 3:
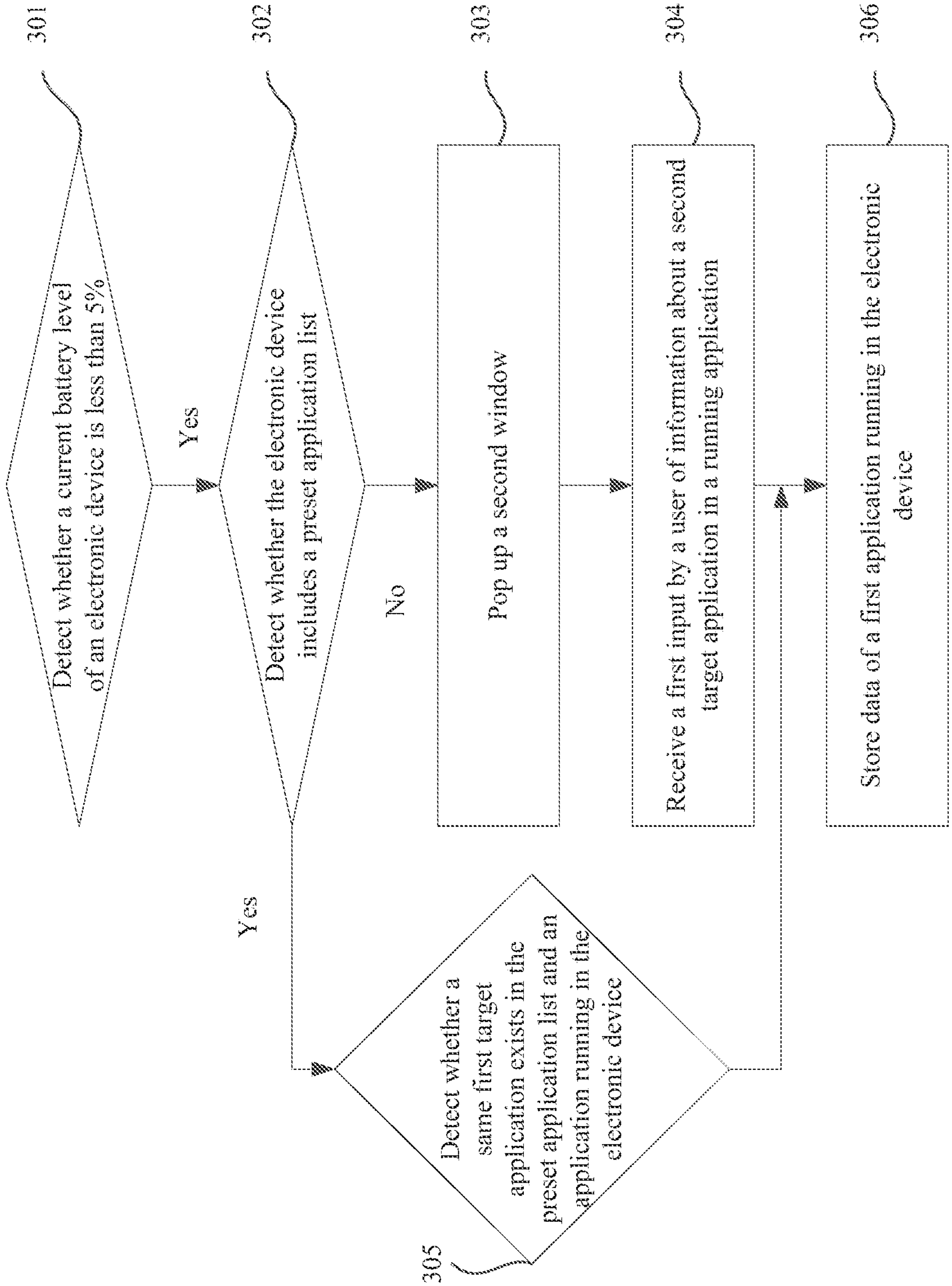
FIG. 3 is a third flowchart of a method for prompting a battery level according to an embodiment of this application.

FIG. 3 is a flowchart of another method for prompting a battery level according to an embodiment. A procedure is as follows.

Step 301: Detect whether a current battery level of an electronic device is less than 5%.

That is, after the current battery level of the electronic device is less than 10%, it may be subsequently detected whether the current battery level of the electronic device is less than 5%. If the current battery level of the electronic device is less than 5%, step 302 may be performed.

Step 302: Detect whether the electronic device includes a preset application list.

That is, it is detected whether a preset application list of which data is to be stored is included. If the preset application list is not included, step 303 may be performed.

Step 303: Pop up a second window.

Information about a currently running application is displayed through the second window, and the user selects the application of which data is to be stored.

Step 304: Receive a first input by a user of information about a second target application in a running application.

The user performs the first input in the second window, may select, through the first input, the application of which the data is to be stored, and may determine, through the first input, an order of storing a selected application. Subsequently, step 306 may be performed. In this case, the first application includes a second target application.

If there is the preset application list, step 305 may be performed.

Step 305: Detect whether a same first target application exists in the preset application list and applications running in the electronic device.

If the same first target application exists in the preset application list and the running application of the electronic device, step 306 may be performed. In this case, the first application includes the first target application.

Step 306: Store data of the first application running in the electronic device.

The data may be stored based on the first input by the user, an order in which the first input is selected, and the selected second target application. In some alternative embodiments, data of the same first target application in the preset application list and the running application may be stored. After the data of the first application is stored, the data may be restored upon power-on next time.

In the foregoing process, automatic storage may be set in the background every two minutes, until a power supply is connected again.

In the method for prompting a battery level in this embodiment of this application, in this embodiment of the present disclosure, the user may be forcibly prompted to perform charging timely and user data may be stored in case of over-discharge, to prevent information loss.

Figure 4:
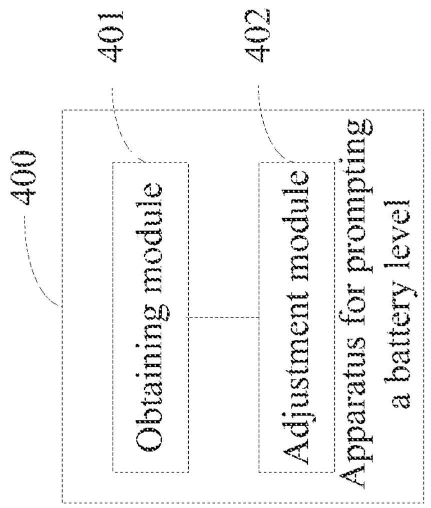
FIG. 4 is a schematic diagram of an apparatus for prompting a battery level according to an embodiment of this application.

As shown in FIG. 4, an apparatus 400 for prompting a battery level in an embodiment is provided. The apparatus 400 includes:

an obtaining module 401, configured to obtain a display mode of a current interface of an electronic device in a case that the electronic device is in an uncharged state, and a battery level of the electronic device is less than a first preset battery level; and an adjustment module 402, configured to perform a target adjustment operation based on the display mode of the current interface, where the target adjustment operation is associated with the display mode of the current interface, and the display mode of the current interface includes a full-screen mode or a non-full-screen mode.

In an embodiment, the performing a target adjustment operation based on the display mode of the current interface includes:

adjusting a target attribute parameter of the electronic device in a case that the display mode of the current interface is the full-screen mode, where the target attribute parameter includes at least one of a volume parameter or a screen display parameter.

In an embodiment, the performing a target adjustment operation based on the display mode of the current interface includes:

performing at least one of the following in a case that the display mode of the current interface is the non-full-screen mode:

enlarging a status bar of the current interface; and enlarging a battery level mark in the status bar.

In an embodiment, the apparatus 400 further includes:

a receiving module, configured to receive an adjustment input by a user after the performing a target adjustment operation based on the display mode of the current interface; and an output module, configured to output first prompt information in response to the adjustment input, where the first prompt information is used to prompt that the electronic device is to be charged.

In an embodiment, the outputting first prompt information includes:

displaying bullet-screen prompt information in the current interface in a case that the display mode of the current interface is the full-screen mode; or displaying a first window on the current interface in a superimposing manner in a case that the display mode of the current interface is the non-full-screen mode, where the first prompt information is included in the first window.

In an embodiment, the apparatus 400 further includes:

a storage module, configured to store data of a first application running in the electronic device if the battery level of the electronic device is less than a second preset battery level in a case that the battery level of the electronic device is less than a first preset battery level, where the second preset battery level is less than the first preset battery level.

In an embodiment, the storing data of a first application running in the electronic device includes at least one of the following:

storing data of a first target application running in the electronic device in a case that a preset application list is included and a same first target application exists in both the preset application list and applications running in the electronic device;

displaying a second window, where information about an application running in the electronic device is included in the second window; receiving, from a user, first input of information about a second target application in running applications, and storing data of the second target application running in the electronic device in response to the first input.

The first application includes at least one of the first target application and the second target application.

The apparatus for prompting a battery level in this embodiment of this application may be an apparatus, a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a Network Attached Storage (NAS), a Personal Computer (PC), a Television (TV), a teller machine, a self-service machine, or the like. This is not specifically limited in the embodiments of this application.

The apparatus for prompting a battery level in this embodiment of this application may be an apparatus with an operating system. The operating system may be an Android operating system, an iOS operating system, or another possible operating system, which is not specifically limited in the embodiments of this application.

The apparatus for prompting a battery level in this embodiment of this application can implement processes implemented in the foregoing embodiments of the method for prompting a battery level. For example, processes implemented in method embodiments from FIG. 1 to FIG. 3 can be implemented. To avoid repetition, details are not described herein again.

Figure 5:
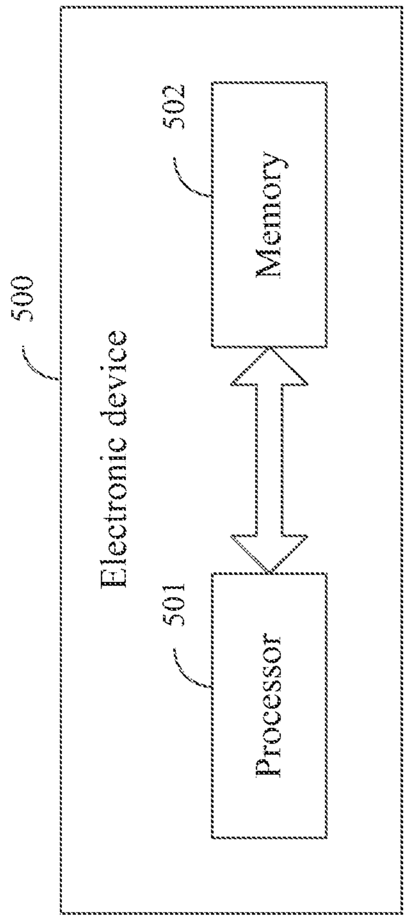
FIG. 5 is a schematic diagram of a structure of an electronic device according to an embodiment of this application.

For example, as shown in FIG. 5, an embodiment of this application further provides an electronic device 500, including a processor 501, a memory 502, and a program or instructions stored in the memory 502 and capable of running on the processor 501. When the program or the instructions are executed by the processor 501, the processes of embodiments of the foregoing method for prompting a battery level are implemented and a same technical effect can be achieved. To avoid repetition, details are not described herein again.

It should be noted that the electronic device in this embodiment of this application includes the foregoing mobile electronic device and the foregoing non-mobile electronic device.

Figure 6:
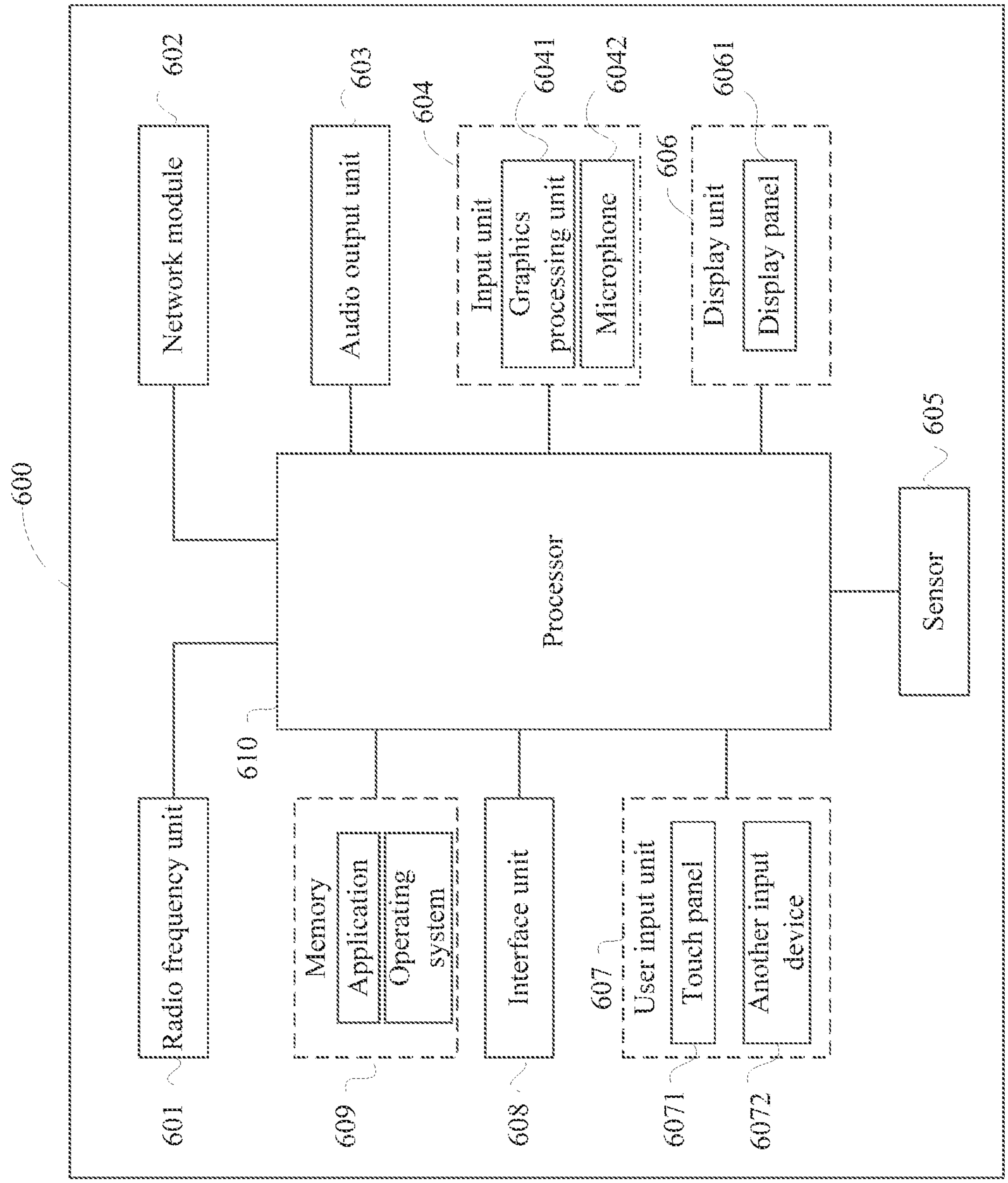
FIG. 6 is a schematic diagram of a hardware structure of an electronic device according to an embodiment of this application.

FIG. 6 is a schematic structural diagram of hardware of an electronic device according to an embodiment of this application.

The electronic device 600 includes but is not limited to: components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the electronic device 600 may further include a power supply (such as a battery) that supplies power to each component. The power supply may be logically connected to the processor 610 by using a power supply management system, to implement functions such as charging and discharging management, and power consumption management by using the power supply management system. The structure of the electronic device shown in FIG. 6 does not constitute a limitation on the electronic device. The electronic device may include more or fewer components than those shown in the diagram, a combination of some components, or different component arrangements. Details are not described herein.

The processor 610 is configured to obtain a display mode of a current interface of an electronic device in a case that the electronic device is in an uncharged state, and a battery level of the electronic device is less than a first preset battery level.

The processor 610 is configured to perform a target adjustment operation based on the display mode of the current interface, where the target adjustment operation is associated with the display mode of the current interface, and the display mode of the current interface includes a full-screen mode or a non-full-screen mode.

In an embodiment, the performing a target adjustment operation based on the display mode of the current interface includes:

adjusting a target attribute parameter of the electronic device in a case that the display mode of the current interface is the full-screen mode, where the target attribute parameter includes at least one of a volume parameter or a screen display parameter.

In an embodiment, the performing a target adjustment operation based on the display mode of the current interface includes:

performing at least one of the following in a case that the display mode of the current interface is the non-full-screen mode:

enlarging a status bar of the current interface; and enlarging a battery level mark in the status bar.

In an embodiment, the user input unit 607 is configured to receive an adjustment input by a user after the performing a target adjustment operation based on the display mode of the current interface.

The display unit 606 is configured to output first prompt information in response to the adjustment input, where the first prompt information is used to prompt that the electronic device is to be charged.

In an embodiment, the outputting first prompt information includes:

displaying bullet-screen prompt information in the current interface in a case that the display mode of the current interface is the full-screen mode; or displaying a first window on the current interface in a superimposing manner in a case that the display mode of the current interface is the non-full-screen mode, where the first prompt information is included in the first window.

In an embodiment, the memory 609 is configured to store data of a first application running in the electronic device if the battery level of the electronic device is less than a second preset battery level in a case that the battery level of the electronic device is less than a first preset battery level, where the second preset battery level is less than the first preset battery level.

In an embodiment, the storing data of a first application running in the electronic device includes at least one of the following:

storing data of a first target application running in the electronic device in a case that a preset application list is included and a same first target application exists in both the preset application list and applications running in the electronic device;

displaying a second window, where information about an application running in the electronic device is included in the second window; receiving, from a user, first input of information about a second target application in running applications; and storing data of the second target application running in the electronic device in response to the first input.

The first application includes at least one of the first target application and the second target application.

It should be understood that, in the embodiments of this application, the input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. The display unit 606 may include a display panel 6061. The display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts a touch detection apparatus and a touch controller. The another input device 6072 may include but is not limited to a physical keyboard, a functional button (such as a volume control button or a power on/off button), a trackball, a mouse, and a joystick. Details are not described herein. The memory 609 may be configured to store a software program and various pieces of data, including but not limited to an application and an operating system. An application processor and a modem processor may be integrated into the processor 610. The application processor mainly processes an operating system, a user interface, an application, and the like. The modem processor mainly processes wireless communication. It may be understood that, in some alternative embodiments, the modem processor may not be integrated into the processor 610.

An embodiment of this application further provides a readable storage medium. The readable storage medium stores a program or an instruction. The storage medium may be volatile or non-volatile. When the program or the instruction is executed by a processor, processes of embodiments of the foregoing method for prompting a battery level are implemented, and a same technical effect can be achieved. To avoid repetition, details are not provided herein again.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface. The communication interface is coupled to the processor. The processor is configured to run a program or instructions to implement processes of embodiments of the foregoing method for prompting a battery level, and a same technical effect can be achieved. To avoid repetition, details are not described herein again.

It should be understood that the chip in the embodiments of this application may also be referred to as a system-level chip, a system chip, a chip system, a system on chip, or the like.

An embodiment of this application further provides a computer program product. The computer program product is stored in a non-transient storage medium. The computer program product is executed by at least one processor to implement processes of the method embodiment shown in FIG. 1, and a same technical effect can be achieved. To avoid repetition, details are not described herein again.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application entirely or the part contributing to the prior art may be implemented in a form of a computer software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A method for prompting a battery level, comprising:

detecting a display mode of a current interface of an electronic device in response to that the electronic device is in an uncharged state and a battery level of the electronic device falls below a first preset battery level;

performing a target adjustment operation based on the display mode of the current interface, wherein: the target adjustment operation adjusts a target attribute parameter comprising at least one of a volume parameter or a screen display parameter, and the target adjustment operation is associated with the display mode of the current interface, and the display mode of the current interface comprises a full-screen mode or a non-full-screen mode;

receiving an adjustment input by a user to counter the adjustment of the target attribute parameter made by the target adjustment operation; and in response to the adjustment input received, determining that the electronic device needs to be charged and outputting first prompt information to prompt the electronic device to be charged, wherein:

when the target adjustment operation is used to reduce the target attribute parameter, the adjustment input is used to increase the target attribute parameter;

when the target adjustment operation is used to increase the target attribute parameter, the adjustment input is used to reduce the target attribute parameter; or when the target adjustment operation is used to perform at least one of enlarging a status bar of the electronic device or enlarging a battery level mark in the status bar, the adjustment input comprises at least one of decreasing the status bar of the electronic device or decreasing the battery level mark in the status bar.

2. The method according to claim 1, wherein the performing a target adjustment operation based on the display mode of the current interface comprises:

performing at least one of the following when the display mode of the current interface is the non-full-screen mode:

enlarging a status bar of the electronic device; or enlarging a battery level mark in the status bar.

3. The method according to claim 1, wherein the outputting first prompt information comprises:

displaying bullet-screen prompt information in the current interface when the display mode of the current interface is the full-screen mode; or displaying a first window on the current interface in a superimposing manner when the display mode of the current interface is the non-full-screen mode, wherein the first prompt information is comprised in the first window.

4. The method according to claim 1, wherein in response to that the battery level of the electronic device falls below the first preset battery level, the method further comprises:

storing data of a first application running in the electronic device in response to that the battery level of the electronic device falls below a second preset battery level, wherein the second preset battery level is below the first preset battery level, wherein the first preset battery level is a battery level threshold that indicates the electronic device is to be charged, and the second preset battery level may be a battery level threshold that indicates that the electronic device is to be powered off.

5. The method according to claim 1, wherein the performing a target adjustment operation based on the display mode of the current interface comprises:

adjusting the target attribute parameter of the electronic device when the display mode of the current interface is the full-screen mode.

6. The method according to claim 5, wherein adjusting the target attribute parameter of the electronic device comprises:

reducing the target attribute parameter of the electronic device to improve a battery level prompting effect.

7. An electronic device, comprising: a processor; and a memory having a computer program or an instruction stored thereon, wherein the computer program or the instruction, when executed by the processor, causes the processor to perform operations comprising:

detecting a display mode of a current interface of the electronic device in response to that the electronic device is in an uncharged state and a battery level of the electronic device falls below a first preset battery level;

performing a target adjustment operation based on the display mode of the current interface, wherein: the target adjustment operation adjusts a target attribute parameter comprising at least one of a volume parameter or a screen display parameter, and the target adjustment operation is associated with the display mode of the current interface, and the display mode of the current interface comprises a full-screen mode or a non-full-screen mode;

receiving an adjustment input by a user to counter the adjustment of the target attribute parameter made by the target adjustment operation; and in response to the adjustment input received, determining that the electronic device needs to be charged and outputting first prompt information to prompt the electronic device to be charged, wherein:

when the target adjustment operation is used to reduce the target attribute parameter, the adjustment input is used to increase the target attribute parameter;

when the target adjustment operation is used to increase the target attribute parameter, the adjustment input is used to reduce the target attribute parameter; or when the target adjustment operation is used to perform at least one of enlarging a status bar of the electronic device or enlarging a battery level mark in the status bar, the adjustment input comprises at least one of decreasing the status bar of the electronic device or decreasing the battery level mark in the status bar.

8. The electronic device according to claim 7, wherein the performing a target adjustment operation based on the display mode of the current interface comprises:

performing at least one of the following when the display mode of the current interface is the non-full-screen mode:

enlarging a status bar of the electronic device; or enlarging a battery level mark in the status bar.

9. The electronic device according to claim 7, wherein the outputting first prompt information comprises:

displaying bullet-screen prompt information in the current interface when the display mode of the current interface is the full-screen mode; or displaying a first window on the current interface in a superimposing manner when the display mode of the current interface is the non-full-screen mode, wherein the first prompt information is comprised in the first window.

10. The electronic device according to claim 7, wherein in response to that the battery level of the electronic device falls below the first preset battery level, the operations further comprise:

storing data of a first application running in the electronic device in response to that the battery level of the electronic device falls below a second preset battery level, wherein the second preset battery level is below the first preset battery level, wherein the first preset battery level is a battery level threshold that indicates the electronic device is to be charged, and the second preset battery level may be a battery level threshold that indicates that the electronic device is to be powered off.

11. The electronic device according to claim 7, wherein the performing a target adjustment operation based on the display mode of the current interface comprises:

adjusting the target attribute parameter of the electronic device when the display mode of the current interface is the full-screen mode.

12. The electronic device according to claim 11, wherein adjusting the target attribute parameter of the electronic device comprises:

reducing the target attribute parameter of the electronic device to improve a battery level prompting effect.

13. A non-transitory computer readable storage medium storing a computer program or an instruction that, when executed by a processor, causes the processor to perform operations comprising:

detecting a display mode of a current interface of an electronic device when the electronic device is in an uncharged state and a battery level of the electronic device falls below a first preset battery level;

performing a target adjustment operation based on the display mode of the current interface, wherein: the target adjustment operation adjusts a target attribute parameter comprising at least one of a volume parameter or a screen display parameter, and the target adjustment operation is associated with the display mode of the current interface, and the display mode of the current interface comprises a full-screen mode or a non-full-screen mode;

receiving an adjustment input by a user to counter the adjustment of the target attribute parameter made by the target adjustment operation; and in response to the adjustment input received, determining that the electronic device needs to be charged and outputting first prompt information to prompt the electronic device to be charged, wherein:

when the target adjustment operation is used to reduce the target attribute parameter, the adjustment input is used to increase the target attribute parameter;

when the target adjustment operation is used to increase the target attribute parameter, the adjustment input is used to reduce the target attribute parameter; or when the target adjustment operation is used to perform at least one of enlarging a status bar of the electronic device or enlarging a battery level mark in the status bar, the adjustment input comprises at least one of decreasing the status bar of the electronic device or decreasing the battery level mark in the status bar.

14. The non-transitory computer readable storage medium according to claim 13, wherein the performing a target adjustment operation based on the display mode of the current interface comprises:

performing at least one of the following when the display mode of the current interface is the non-full-screen mode:

enlarging a status bar of the electronic device; or enlarging a battery level mark in the status bar.

15. The non-transitory computer readable storage medium according to claim 13, wherein the performing a target adjustment operation based on the display mode of the current interface comprises:

adjusting the target attribute parameter of the electronic device when the display mode of the current interface is the full-screen mode.

16. The non-transitory computer readable storage medium according to claim 15, wherein adjusting the target attribute parameter of the electronic device comprises:

reducing the target attribute parameter of the electronic device to improve a battery level prompting effect.

* * * * *